Feb. 25, 1969  W. E. SWARTZ  3,429,001

SAUSAGE MAKING APPARATUS

Filed Sept. 12, 1966

INVENTOR
William E. Swartz

United States Patent Office 3,429,001
Patented Feb. 25, 1969

---

3,429,001
SAUSAGE MAKING APPARATUS
William E. Swartz, McKeesport, Pa., assignor to Calgon Corporation, a corporation of Pennsylvania
Filed Sept. 12, 1966, Ser. No. 578,553
U.S. Cl. 17—35                          3 Claims
Int. Cl. A21c *11/00, 11/16*

ABSTRACT OF THE DISCLOSURE

An apparatus is provided for making sausage of alternate slugs of meat having two sausage container means for delivering sausage from said containers, a stuffing horn receiving a casing to be filled, valve means between the containers and horn having a plurality of inlets, one operatively connected to each container and an outlet, means between the inlet and outlet for alternately connecting each inlet with the outlet in timed sequence to feed alternate slugs of sausage to the casing.

---

This invention relates to sausage making apparatus and particularly to apparatus for making sausages of alternate colors providing a striped effect, by stuffing alternate slugs of different meant emulsions, as for example, alternate slugs of cured meat emulsion and poultry meat emulsion.

The present invention provides an apparatus for making sausage of alternate stripes of meat which is readily controlled to provide stripes of selected sizes. Preferably, I provide at least two sausage emulsion containers, means for delivering emulsion from the emulsion containers, a sausage stuffing horn, a multiplicity of inlets to the stuffing horn, each of said inlets connected to an emulsion container through the emulsion delivering means, a selector valve between said inlets and said horn and means for moving said selector valve to alternately and selectively connect the inlets to the horn whereby to feed alternate slugs of emulsion from the emulsion containers to a casing on said stuffing horn. Preferably the selector valve is a slide valve actuated by solenoids, air pressure, or mechanical drive means such as a rotary cam.

The means for delivering emulsion may be a pump, pressurized emulsion containers or any other well-known means of delivering a sausage emulsion.

In the foregoing general statement of my invention, I have set out certain objects, purposes and advantages of my invention. Other objects, purposes and advantages of the invention will be apparent from a consideration of the following description and the accompanying drawings in which.

Figure 1:
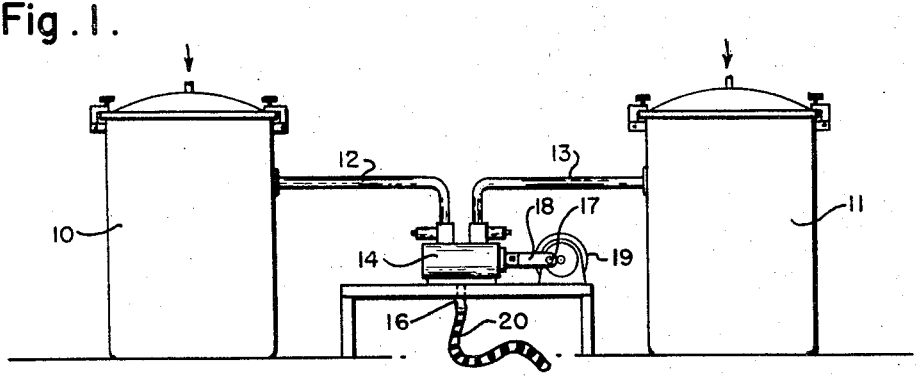
FIGURE 1 is an elevational view of an apparatus according to my invention.
Figure 2:
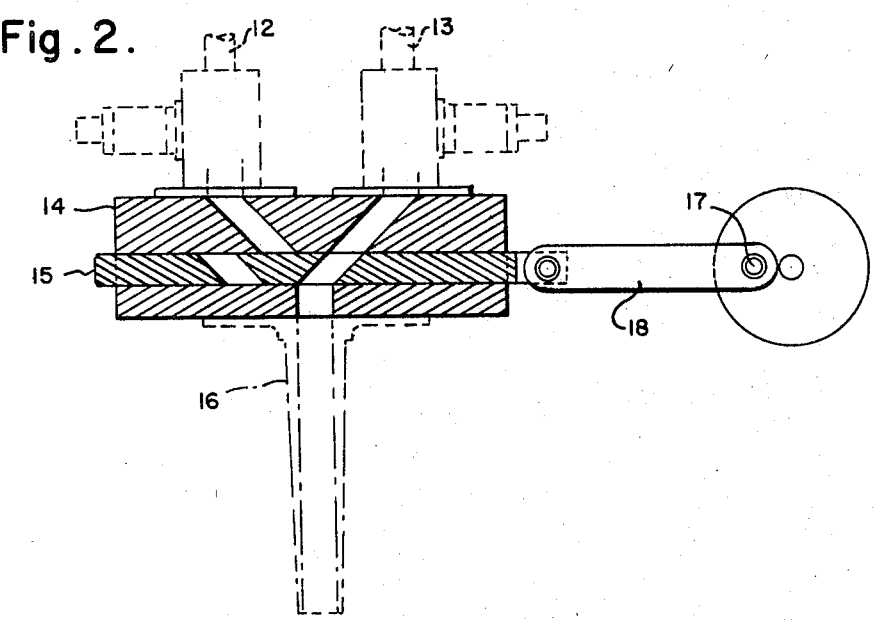
FIGURE 2 is a section through the selector valve of FIGURE 1.

Referring to the drawings, I have illustrated two emulsion vessels 10 and 11 under air pressure. Each of the vessels 10 and 11 is connected by lines 12 and 13 to a selector valve 14. Selector valve 14 has a sliding core 15 movable from a first position connecting container 10 with a stuffing horn 16 to a second position connecting container 11 with the stuffing horn 16. The core 15 is connected to a rotating eccentric crank pin 17 by connecting rod 18. The crank pin 17 is rotated by an electric motor 19.

The operation of the apparatus of this invention is as follows. Emulsions of two different colors such as poultry and cured meat are placed in vessels 10 and 11 respectively. The vessels 10 and 11 are pressurized to force the emulsion into lines 12 and 13. When the selector valve is moved successively from the first to second positions, successive slugs of emulsion are fed from vessels 10 and 11 through stuffing horn 16 into casing 20 creating a striped appearance to the resulting sausage. This results in a highly attractive and saleable product.

In the foregoing specification, I have described a presently preferred embodiment and practice of my invention. It will be understood, however, that this invention may be otherwise embodied within the scope of the following claims.

I claim:

1. An apparatus for making sausage of alternate slugs of meat comprising at least two sausage containers, means for delivering sausage from said containers, a sausage stuffing horn receiving a casing to be filled, valve means between the containers and the stuffing horn, said valve means having a plurality of inlets, one operatively connected to each of the sausage containers, and a single outlet, means between said inlets and outlet for alternately connecting each of the inlets with the outlet in timed sequence whereby to feed alternate slugs of sausage from the sausage containers to the casing.

2. An apparatus as claimed in claim 1 wherein the selector valve is a slide valve.

3. An apparatus as claimed in claim 2 wherein the slide valve is connected to a rotary crank having a throw sufficient to move the valve alternately from one inlet to the other whereby to connect the inlets alternately in timed sequence to the outlet.

References Cited

UNITED STATES PATENTS

| | | | |
|---|---|---|---|
| 793,484 | 6/1905 | Wenrich | 17—38 |
| 1,851,034 | 3/1932 | Blatter | 137—610 |
| 3,042,964 | 7/1962 | Rosenthaler | 17—35 |
| 3,108,318 | 10/1963 | Miller et al. | 17—39 |

FOREIGN PATENTS 115,644   1/1946   Sweden.

LUCIE H. LAUDENSLAGER, *Primary Examiner.*

U.S. Cl. X.R.

99—109